United States Patent [19]
Kira et al.

[11] Patent Number: 5,635,575
[45] Date of Patent: Jun. 3, 1997

[54] AGENT FOR WATER TREATMENT CONTAINING A POLYMER FOR WATER TREATMENT AND A PROCESS FOR PRODUCING SAID POLYMER

[75] Inventors: Mayumi Kira; Norimasa Kobayashi, both of Tokyo, Japan

[73] Assignee: Kurita Water Industries Ltd., Tokyo, Japan

[21] Appl. No.: 317,882

[22] Filed: Oct. 4, 1994

[30] Foreign Application Priority Data

Oct. 7, 1993 [JP] Japan .................. 5-276147

[51] Int. Cl.⁶ .............. C08F 236/00; C08F 228/02; C08F 220/04; C08F 222/06; C02F 5/10
[52] U.S. Cl. .............. 526/284; 526/271; 526/287; 526/317.1; 252/180
[58] Field of Search ................ 526/284, 287, 526/317.1, 271; 252/180

[56] References Cited

U.S. PATENT DOCUMENTS

| | | |
|---|---|---|
| 4,707,523 | 11/1987 | Chang et al. .................. 525/372 |
| 4,813,973 | 3/1989 | Winnik et al. . | |

FOREIGN PATENT DOCUMENTS

| | | |
|---|---|---|
| 0228593A3 | 6/1987 | European Pat. Off. . |
| 0485882A1 | 5/1992 | European Pat. Off. . |
| 5-163591 | 6/1993 | Japan . |

OTHER PUBLICATIONS

Patent Abstracts of Japan, vol. 018 No. 061 (C–1160), 2 Feb. 1994 of JP-A-05 277491 (Hakutou KK) 26 Oct. 1993.

Database WPI, Section CH, Week 9347, Derwent Publications Ltd., London, GB, Class D15, AN 93-373793.

*Primary Examiner*—Joseph L. Schofer
*Assistant Examiner*—Wu C. Cheng
*Attorney, Agent, or Firm*—Frishauf, Holtz, Goodman, Langer & Chick, P.C.

[57] ABSTRACT

A polymer having the function of water treatment and labeled with a fluorescent substance having a allyl group is disclosed. A process for producing the polymer for water treatment having the function of water treatment and labeled with a fluorescent substance having allyl group comprises copolymerizing a fluorescent substance having allyl group obtained by introducing allyl group into a fluorescent substance using a Grignard reagent with a monomer having a polymerizable double bond. The polymer having the function of water treatment and labeled with a fluorescent substance having an allyl group can be obtained under atmospheric pressure. Concentration of the polymer for water treatment can be measured conveniently, accurately and quickly. Therefore, concentration of the polymer in water can be easily adjusted to the optimum value. Degradation of the labeled polymer by chlorine can be prevented when an agent for water treatment containing the labeled polymer and a hydantoin compound is used.

18 Claims, 1 Drawing Sheet

AGENT FOR WATER TREATMENT CONTAINING A POLYMER FOR WATER TREATMENT AND A PROCESS FOR PRODUCING SAID POLYMER

BACKGROUND OF THE INVENTION

1. Field of the Invention

The present invention relates to a novel polymer for water treatment, an agent for water treatment containing the polymer for water treatment, a process for treating water which comprises adjusting concentration of the polymer for water treatment in water for treatment, and a novel process for producing a polymer for water treatment. More particularly, the present invention relates to a labeled polymer for water treatment concentration of which in water can be measured conveniently, accurately and quickly, application of the labeled polymer for water treatment, and a process for producing the polymer for water treatment by which the labeled polymer for water treatment can be produced under atmospheric pressure.

2. Description of the Related Art

Recently, various kinds of polymer are added to boiler water, cooling water and the like for the purpose of preventing scale formation and corrosion. As such polymers, for example, acrylic acid polymers, maleic acid polymers and acrylamide polymers are used. For exhibiting the effect, concentration of the polymer is generally about 1 to 100 mg/liter. When such polymers are used, it is desirable that concentration of the polymer in water is kept at the minimum value sufficient for exhibiting the effect. Addition of an excess amount of the polymer is not only economically disadvantageous but also causes problems that load for waste water treatment is increased and that the effect is even decreased depending on the kind of polymer. The concentration of the polymer is decreased because the polymer in water is consumed in the system and, at the same time, lost together with the waste water discharged from the system. Therefore, it is necessary that the concentration of the polymer in the system is measured and the polymer is added to the system in an amount adjusted to keep the concentration at the optimum value.

As the method of measuring concentration of a polymer in water, for example, colorimetric method, turbidimetric method, lithium tracer method and fluorescent tracer method are known. However, the colorimetric method and the turbidimetric method are conducted by manual operation because automatic operation is difficult with these methods and have a drawback that the measurement requires a long time. Measurement with the tracer methods can be conducted in a short time and automatic operation is possible. However, they have a drawback in that they cannot show consumption of the polymer in the system because the measurement is made not with the polymer itself but with another compound (a tracer) which is added simultaneously and easily measured.

As described above, the conventional methods of measurement have a drawback in that they cannot achieve accurate and quick measurement of a polymer in water and, therefore, amount of the addition of the polymer to the system cannot be adjusted automatically in response to changes in the concentration of the polymer in water.

For overcoming these drawbacks, the present inventors has proposed a polymer for water treatment labeled with a fluorescent substance (Japanese Patent Application Laid-Open No. Heisei 5(1993)-163591). However, the proposed polymer for water treatment has a drawback in that intensity of the fluorescence rapidly diminishes by the effect of the sunlight and the polymer is not always satisfactory. A polymer having a side chain group of sulfonated naphthalene labeled with a fluorescent substance is disclosed in Japanese Patent Application Laid-Open No. Heisei 4(1992)-233918. The side chain group is introduced into a polymer having a carboxyl-type side group by transamidation reaction.

However, the transamidation reaction requires an environment of a high temperature and a high pressure and is not preferable in view of safety.

SUMMARY OF THE INVENTION

The present invention accordingly has an object to provide a polymer for water treatment concentration of which in water, such as boiler water and cooling water, is measured directly, conveniently, accurately and quickly.

The present invention has another object to provide a process for treating water which comprises adjusting concentration of the polymer for water treatment in the water for treatment.

The present invention has still another object to provide a process for producing the polymer for water treatment labeled with a fluorescent substance by reaction under atmospheric pressure.

The present invention has still another object to prevent degradation of the polymer for water treatment labeled with a fluorescent substance caused by chlorine compounds such as chlorine gas, sodium hypochlorite and calcium hypochlorite which is added to the water for preventing occurrence of hazard caused by slime or the like.

Extensive investigations undertaken by the present inventors with the objects described above lead to discoveries that, by using a polymer for water treatment labeled with a fluorescent substance which is preferably less affected by the substances present in the water and by the sunlight, concentration of the polymer in water is measured conveniently, accurately and quickly by measuring concentration of the unit of the fluorescent substance by a fluorescence photometer, that, by using the polymer for water treatment labeled with the fluorescent substance, the concentration of the polymer in water can be easily adjusted to the optimum value, and that degradation of the polymer for water treatment labeled with a fluorescent substance caused by chlorine compounds can be prevented by addition of a hydantoin compound. The present invention has been completed on the basis of the discoveries.

Thus, the present invention provides an agent for water treatment which comprises a polymer having the function of water treatment and labeled with a fluorescent substance having an allyl group.

The present invention also provides the polymer for water treatment described above which additionally comprises a hydantoin compound.

The present invention also provides a process for treating water which comprises adding an agent for water treatment, which contains a polymer having the function of water treatment and labeled with a fluorescent substance having an allyl group, to water for treatment, measuring concentration of the labeled polymer by the fluorescence analysis and adjusting the concentration of the labeled polymer in the water for treatment in the range of 1 to 100 mg/liter.

The present invention also provides a process for producing a polymer for water treatment having the function of water treatment and labeled with a fluorescent substance having an allyl group, which comprises copolymerizing the fluorescent substance having an allyl group obtained by introducing an allyl group into a fluorescent substance using a Grignard reagent with a monomer having a polymerizable double bond.

BRIEF DESCRIPTION OF THE DRAWINGS

The invention will be described with reference to the accompanying drawings, wherein:

In FIG. 1, ultra-pure water is used as the base water at room temperature. This is left standing at a pH=8.5 (with addition of a buffer). Concentration of the labeled polymer: 10 mg/liter. In FIG. 2, ultra-pure water is used as the base water at room temperature. This is left standing at a pH=8.5 (with addition of a buffer). DMH: 8 mg/liter, chlorine: 1 mg/liter, Data is taken one day after the test started.

DETAILED DESCRIPTION OF THE INVENTION

Figure 1:
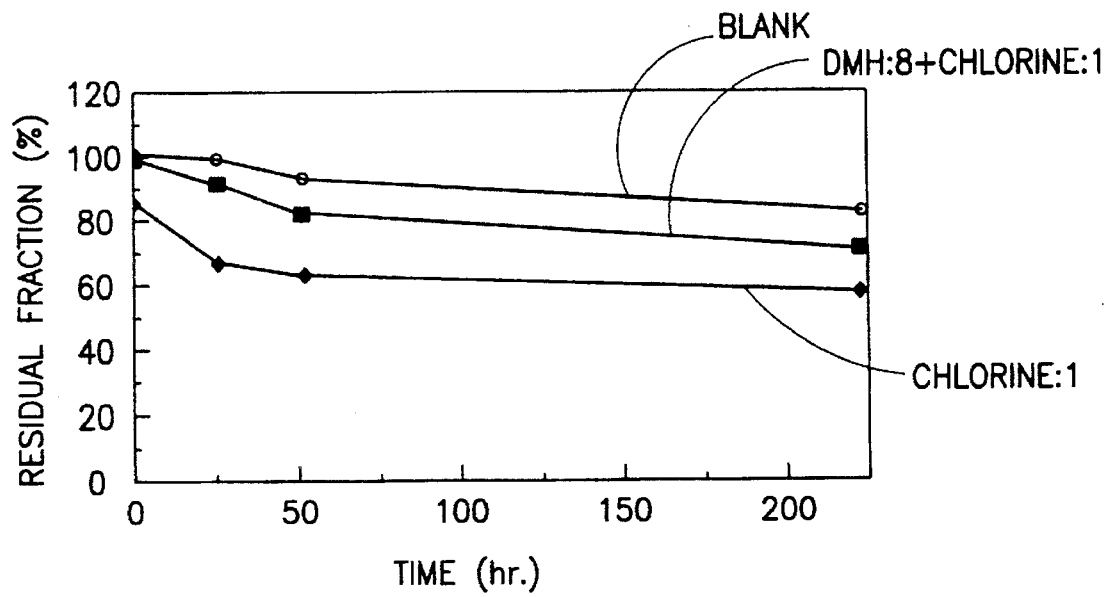
FIG. 1 shows effect of 5,5-dimethylhydantoin (referred to as DMH hereinafter) on decrease in the fluorescence intensity of the labeled polymer by chlorine with time.

The present invention is described in detail in the following.

The polymer for water treatment labeled with a fluorescent substance of the present invention can be obtained by copolymerizing a fluorescent substance having an allyl group as a monomer and a monomer used for preparing a polymer having the function of water treatment such as prevention of scale formation and corrosion. The polymer has the fluorescent property in combination with the function of water treatment, such as prevention of scale formation and corrosion.

When concentration of a polymer in water is measured by labeling the polymer with a fluorescent substance, adding the polymer into water and measuring concentration of the unit of the fluorescent substance by the fluorescence analysis, the most important technical points are that intensity of the fluorescence emitted from the unit of the fluorescent substance does not change with time in water and that the unit of the fluorescent substance is not cleaved off from the polymer to which it is bonded. When any of these unfavorable phenomena occurs in water, error in the measurement is caused and the object of the present invention cannot be achieved. Many kinds of fluorescent substance have been known. However, when a fluorescent substance is added into water, intensity of fluorescence of the fluorescent substance is very often decreased with time by reaction with substances present in water, such as copper ion, or by photochemical reactions caused by the sunlight because fluorescent substances generally have large reactivities. Even when a stable fluorescent substance showing no decrease of intensity of fluorescence with time is used, the unit of the fluorescent substance may be cleaved off from the polymer to which it is bonded by a chemical reaction, such as hydrolysis, during the application when type of the chemical bond for the labeling between the unit of the fluorescent substance and the polymer is not appropriate.

In contrast to the conventional fluorescent substances having the problems described above, the fluorescent substance used in the polymer for water treatment of the present invention has the characteristic property that the fluorescent substance is very stable and the unit of the fluorescent substance is not cleaved off from the polymer to which it is bonded by a reaction like hydrolysis because it is stable in water, not sensitive to substances present in water or to the sunlight and the unit of the fluorescent substance is bonded to the polymer through the carbon-carbon covalent bond.

Furthermore, according to the present invention, degradation of the polymer for water treatment labeled with the fluorescent substance can be prevented by adding a hydantoin compound. As the hydantoin compound, 5,5-dimethylhydantoin, 5,5-methylethylhydantoin, 5,5-methylbutylhydantoin, 1-methylol-5,5-dimethylhydantoin, and the like can be effectively used. Particularly, 5,5-dimethylhydantoin is preferable. The hydantoin compound is added to the water for treatment in such an amount that the concentration is 0.1 to 50 mg/liter, preferably 1 to 20 mg/liter. Ratio by weight of the hydantoin compound to the polymer for water treatment labeled with the fluorescent substance is 0.005 to 1.0.

The fluorescent substance used as the monomer for preparing the polymer for water treatment labeled with the fluorescent substance of the present invention includes fluorescent substances obtained by reaction of fluorescent substances having one carbonyl or aldehyde group with Grignard reagents having an allyl group. Specific examples of the fluorescent substance of the present invention include 5-allyldibenzosuberenol, 9-(1hydroxy-3-butenyl) anthracene, 1-(1-hydroxy-3-butenyl)naphthalene, 2-hydroxy-2-allyl-1-benzopyran, and 9-allyl-9-hydroxyxanthene. The fluorescent substance is suitably selected according to the kind and the application of the polymer to be labeled. Among these substances, 5-allyldibenzosuberenol is particularly preferable because of the strong intensity of fluorescence and insensitivity to disturbance by substances present in water.

For synthesizing the fluorescent substance used as the monomer, a Grignard reagent having an allyl group which is not particularly limited, such as allyl magnesium halide, is brought into reaction with a fluorescent substance having one carbonyl group or one aldehyde group, such as dibenzosuberenone, 9-anthraldehyde, 1-naphthaldehyde, coumarine, and xanthene.

For example, 5-allyldibenzosuberenol which is a preferable fluorescent substance having an allyl group of the present invention has the structure shown by the following formula [1]:

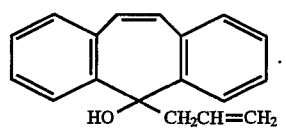

[1]

This substance can be prepared easily by bringing dibenzosuberenone [2] into reaction with a Grignard reagent having an allyl group, such as allyl magnesium chloride [3], to obtain an intermediate product [4] and then hydrolyzing the intermediate product with an acid according to the scheme shown in the following:

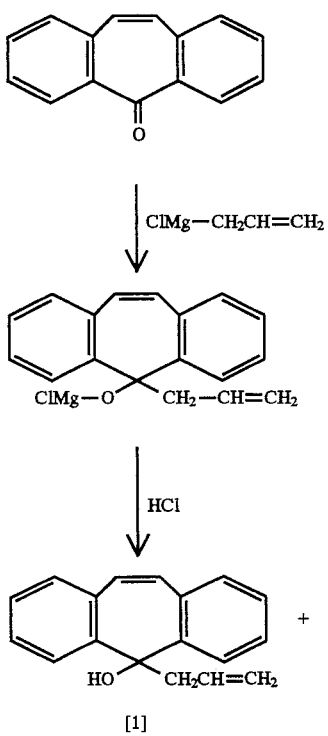

The product, 5-allyldibenzosuberenol, is insoluble in water and soluble in many organic solvents, such as ethanol and methylene chloride. The fluorescent substance may be used singly or as a combination of two or more kinds.

The monomer used for preparing a polymer having the function of water treatment such as prevention of scale formation and corrosion includes various kinds of monomer having various kinds of functional group and a polymerizable double bond. Examples of such monomer include compounds containing carboxyl group, such as acrylic acid, maleic acid, itaconic acid and methacrylic acid; salts of these compounds; compounds containing sulfonic acid group, such as vinylsulfonic acid, styrenesulfonic acid and allylsulfonic acid; salts of these compounds; compounds containing hydroxyl group, such as 2-hydroxyethylmethacrylate; compounds containing amide group, such as acrylamide and methacrylamide; compounds containing amide group and sulfonic acid group, such as 2-acrylamido-2-methylpropanesulfonic acid; salts of these compounds; compounds containing hydroxyl group and sulfonic acid group, such as 3-allyloxy-2-hydroxypropanesulfonic acid; salts of these compounds; methyl acrylate, isobutylene, and amylene. The monomer may be used singly or as a combination of two or more kinds.

The labeled polymer for water treatment of the present invention can be produced by copolymerizing one or more kinds of the monomer having the functional group described above and a polymerizable double bond, the fluorescent substance having an allyl group described above and one or more kinds of other copolymerizable monomers used according to necessity. The unit of the fluorescent substance having an allyl group is preferably introduced into the polymer in such an amount that the minimum concentration of the polymer required for the accurate measurement by the fluorescence analysis is contained in water in the application of the polymer in water. The amount is different depending on concentrations of disturbing substances in the water. The amount is generally 0.01 to 20% by mol, preferably 0.05 to 10% by mol. When the amount is less than 0.01% by mol, the measurement of the concentration is difficult. When the amount is more than 20% by mol, unfavorable effects on the function of preventing scale formation and corrosion are found.

Method of copolymerizing the fluorescent substance used as one of the monomers and the monomer for preparing the polymer having the function of water treatment is not particularly limited. For example, the copolymerization can be conducted by radical polymerization. In this case, a solvent is used so that both the fluorescent substance used as one of the monomers and the monomer for preparing the polymer having the function of water treatment are dissolved in the solvent to mix with each other. Examples of such a solvent include ethanol, acetone, methyl ethyl ketone and toluene. As the polymerization initiator, for example, an organic peroxide, such as an azo compound like azobisisobutyronitrile or benzoyl peroxide, is preferably used.

The polymer for water treatment labeled with the fluorescent substance thus obtained may be added to a water system alone or in combination with polymers which are not labeled with a fluorescent substance. When the polymer labeled with a fluorescent substance is added in combination with a polymer not labeled with a fluorescent substance, relative amounts of the polymers are suitably selected according to desired accuracy of the measurement. It is preferable that the polymer labeled with a fluorescent substance is added into a water system in such an amount that concentration of the solid matter in the water is in the range of 1 to 100 mg/liter.

An example of the process for treating water by using the polymer for water treatment of the present invention is described in the following.

First, a sample of water containing the polymer for water treatment labeled with a fluorescent substance is taken. After the matter not dissolved in water is removed from the sample by a method like filtration, intensity of fluorescence of the sample is measured by using a fluorescence spectrophotometer adjusted to a specified wave length. Concentration of the polymer is obtained by using a calibration curve which has been prepared in advance. The concentration of the polymer is compared with the optimum concentration for the water treatment. When necessary, a suitable amount of the polymer is added to the water system automatically or manually to adjust the concentration.

To summarize the advantages obtained by the invention, the polymer for water treatment of the present invention is a polymer which has the function of water treatment such as prevention of scale formation and corrosion and is labeled with a fluorescent substance having an allyl group. The polymer can be synthesized at atmospheric pressure. By using the polymer, concentration of the polymer in water is measured very conveniently, accurately and quickly. As the result, the concentration of the polymer in water can be easily adjusted to the optimum value by controlling the amount of addition of the polymer into water. Thus, the water treatment can be performed economically and effectively. Furthermore, degradation of the labeled polymer by chlorine can be prevented when an agent for water treatment containing the labeled polymer and the hydantoin compound is used.

EXAMPLES

The invention will be understood more readily with reference to the following examples; however, these examples are intended to illustrate the invention and are not to be construed to limit the scope of the invention.

PREPARATION EXAMPLE 1

Preparation of 5-allyldibenzosuberenol

In a glove box through which a nitrogen stream is passed, 5.43 g (0.025 mol) of a dibenzosuberenone reagent (a product of Aldrich Company; purity, 97%) was dissolved into 100 ml of tetrahydrofuran (dehydrated with sodium metal in advance) in a 200 ml Erlenmeyer flask. To this solution, 18.8 ml of a 2M tetrahydrofuran solution of allyl magnesium chloride (a product of Aldrich Company) was added in the glove box. The flask was covered with a plastic wrapping film (a polyvinylidene chloride film) and left standing for one night (15 hours). The flask was then taken out of the glove box. The content was transferred to an egg plant shape flask and most of tetrahydrofuran as the solvent was removed using a rotary evaporator.

After the reaction product was cooled to room temperature, 100 ml of dichloromethane and 100 ml of 1N hydrochloric acid were added. The mixture was shaken well and left standing. Then, it was transferred to a 500 ml separation funnel. The lower dichloromethane layer was transferred to another separation funnel and the upper water layer was disposed. To the dichloromethane layer, 400 ml of desalted water and 5 ml of 1N hydrochloric acid were added. The mixture was shaken well and left standing. The lower dichloromethane layer was transferred to still another separation funnel and the upper water layer was disposed. The washing with 400 ml of desalted water was repeated 3 times by the same operation. Then, the dichloromethane layer was transferred to another egg plant shape flask. Dichloromethane was removed using a rotary evaporator and the residual product was dried in a vacuum drying oven until the pressure reached 0.01 Torr.

Thus, 6.21 g of a yellowish brown viscous liquid was obtained. The liquid was identified with infrared analysis, mass analysis and nuclear magnetic resonance analysis and confirmed to be 5-allyldibenzosuberenol.

EXAMPLE 1

(1) Preparation of an Aqueous Solution of a Labeled Polymer for Water Treatment Into a 100 ml three-necked flask, 6.23 g (0.025 mol) of 5-allyldibenzosuberenol prepared in Preparation Example 1, 10.0 g (0.1 mol) of maleic anhydride and 60 ml of toluene dehydrated with calcium hydrate in advance were added and the mixture was heated to 70° C. under stirring. After maleic anhydride was dissolved, the mixture was cooled to 30° C. and then 2.05 g (0.0125 mol) of azobisisobutyronitrile was added. A stirrer, a Dimroth cooler and a thermometer were attached to the flask and the mixture was heated to 80° C. for 5 hours. Precipitates of a polymer were formed.

The reaction mixture was cooled to 30° C. and toluene was removed by decantation. To the remaining reaction mixture, 6 ml of methyl ethyl ketone was added and the polymer was dissolved by heating to 85° C. under stirring. The solution was dropped into 254 ml of toluene and the polymer was precipitated. The polymer was filtered using Advantec No. 5C filter paper, washed with toluene, dried in a vacuum drying oven and weighed. Yield was 8.55 g.

The polymer thus obtained was dissolved in 34.0 ml of desalted water and pH of the solution was adjusted to 9.5 by adding 40% by weight aqueous solution of sodium hydroxide. Concentration of the polymer calculated as the disodium salt was adjusted to 20 % by weight with additional water.

Fluorescent property of the aqueous solution of the polymer was measured by using a fluorescence spectrophotometer (a product of Nippon Bunko Kogyo Co., Ltd.; FP-777 type). The maximum excited wave length was 293.0 nm, the maximum fluorescence wave length was 359.0 nm, and intensity of the fluorescence per 10 mg/liter of the polymer (as the disodium salt) was 32,100.

Measurement of the composition of the polymer by nuclear magnetic resonance method showed that ratio of the maleic acid unit/the 5-allyldibenzosuberenol unit (molar ratio) was 86/14.

(2) Test of the Effect of Suppressing Formation of Calcium Carbonate Scales

Calcium chloride in an amount corresponding to 250 mg of $CaCO_3$/liter and sodium hydrogen carbonate in an amount corresponding to 250 mg of $CaCO_3$/liter were added to water and the polymer labeled with the fluorescent substance obtained in (1) described above was added to the mixture in an amount to make a solution of a specified concentration. Using sodium hydroxide and hydrochloric acid, pH of the solution was adjusted to 8.5 to prepare 500 ml of a sample solution.

The sample solution prepared was charged into a conical beaker and sealed with a plastic wrapping film and a rubber ring. The sample solution was left standing in a thermostatted water tank kept at 60° C. for 20 hours to form precipitates of calcium carbonate. After 20 hours, the conical beaker was taken out of the water tank. Calcium carbonate precipitates formed were removed from the sample solution by filtering the sample solution with a 0.1 μm pore filter and concentration of the residual calcium in the tiltrate was measured. Results of the measurements are shown in Table 1.

TABLE 1

| concentration of added polymer (mg/liter) | amount of residual calcium (as $CaCO_3$) (mg/liter) | amount of precipitated calcium carbonate (mg/liter) |
|---|---|---|
| 0 | 188 | 62 |
| 0.25 | 228 | 22 |
| 0.5 | 240 | 10 |
| 0.75 | 246 | 4 |
| 1.0 | 258 | −8 |
| 3.0 | 250 | 0 |
| 10.0 | 250 | 0 |

As shown in Table 1, the polymer labeled with the fluorescent substance obtained in (1) described above exhibited remarkable effect of suppressing the formation of precipitates of calcium carbonate with the application in a low concentration.

(3) Measurement of Fluorescence and Calculation of Concentration of the Polymer Samples of cooling water taken from randomly chosen open circulating cooling water systems A and B were each filtered with an Advantec No. 5C filter paper. To 1 liter of each filtered sample water, the polymer labeled with the fluorescent substance obtained in (1) described above was added in an amount to make a solution of a concentration of 5, 10 or 15 mg/liter. After the sample water was mixed well with stirring, the fluorescence analysis was conducted. Intensity of the fluorescence at the excited wave length of 293.0 nm and fluorescence wave length of 359.0 nm was measured after the sample solution was diluted to a concentration showing the intensity of the fluorescence of 10,000 or lower. Then, concentration of the polymer was calculated and error of the measurement was examined. Results of the calculations are shown in Table 2.

TABLE 2

| cooling water system | concentration of labeled polymer (mg/liter) | measured intensity of fluorescence | increase in intensity of fluorescence by addition of the polymer | concentration obtained from increase in intensity of fluorescence (mg/liter) | error of mearure- ment (%) |
|---|---|---|---|---|---|
| A | 0 | 660 | — | — | — |
|   | 5 | 17,500 | 16,840 | 5.25 | +5.0 |
|   | 10 | 33,300 | 32,640 | 10.17 | +1.7 |
|   | 15 | 50,500 | 49,840 | 15.53 | +3.5 |
| B | 0 | 980 | — | — | — |
|   | 5 | 17,800 | 16,820 | 5.24 | +4.8 |
|   | 10 | 34,000 | 33,020 | 10.29 | +2.9 |
|   | 15 | 52,000 | 51,020 | 15.89 | +5.9 |

As shown in Table 2, the error of the measurement was 6% or less. The time required for the measurement of a sample was about 1 minute. Thus, the measurement was accurate as well as quick.

Concentration of the labeled polymer can be adjusted on the basis of the results of the measurement shown above.

EXAMPLE 2

To ultra-pure water, chlorine is added in such an amount that the concentration is 1 mg/liter. A specified amount of the labeled polymer prepared in Example 1 is added to the solution thus prepared. By adding a buffer solution, pH of the solution is adjusted to 8.5 and the solution was left standing at room temperature. Concentration of the labeled polymer was obtained according to the method of measurement of fluorescence described in Example 1 (3) and change of the concentration with time was observed. 5,5-Dimethylhydantoin (DMH) was added to this solution in such an amount that the concentration is 8 mg/liter. Change of the concentration of the labeled polymer with time was examined similarly.

FIG. 1 shows change of the concentration of the labeled polymer with time when the polymer is added in such an amount that the concentration is 10 mg/liter. The ordinate shows residual fraction of the concentration of the labeled polymer and the abscissa shows time. Result of the measurement when neither chlorine or DMH is added is shown as the blank run in the figure as well.

Figure 2:
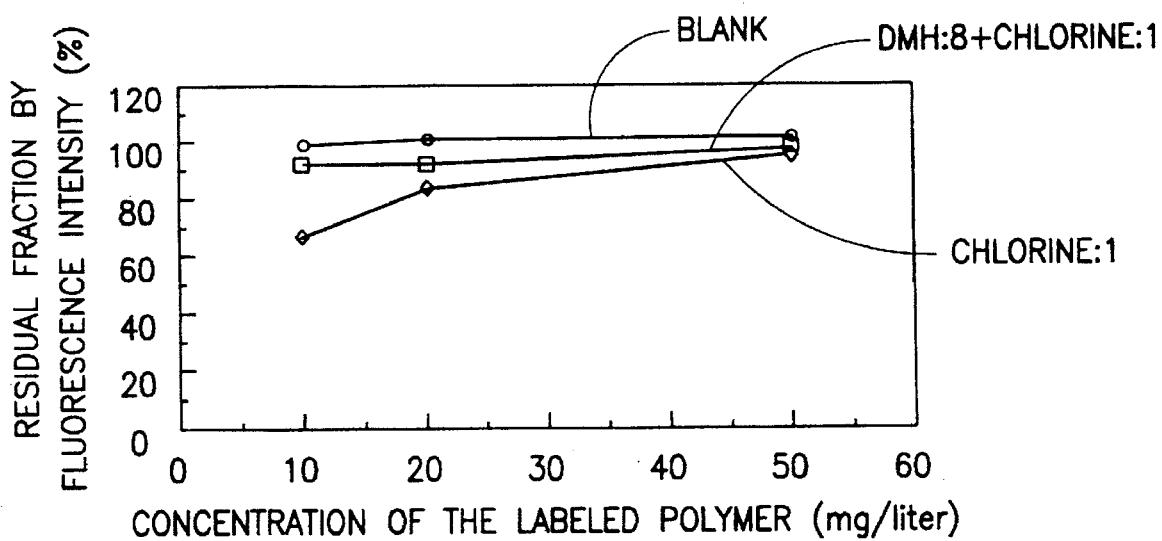
FIG. 2 shows effect of DMH on decrease in the fluorescence intensity of the labeled polymer by chlorine at various concentrations of the labeled polymer.

FIG. 2 shows residual fraction of the labeled polymer about one day after the test started (the ordinate) against concentration of the labeled polymer added.

When DMH is added, the residual fraction of the labeled polymer was higher than those in the absence of DMH even when chlorine is present. Particularly, the effect of DMH is remarkable when the concentration of the labeled polymer is as low as 10 mg/liter.

What is claimed is:

1. An improved agent for water treatment which comprises a polymer having the function of water treatment for corrosion prevention or scale prevention wherein the improvement comprises said polymer incorporating units of a labeled monomer which is labeled with a fluorescent substance and has an allyl group.

2. An agent for water treatment which comprises a polymer having the function of water treatment and labeled with a fluorescent substance having an allyl group, said agent additionally comprising a hydantoin compound.

3. An agent for water treatment according to claim 1, wherein the polymer is a water-soluble polymer comprising units of a monomer containing carboxyl group.

4. An agent for water treatment which comprises a polymer having the function of water treatment and labeled with a fluorescent substance having an allyl group, and wherein the fluorescent substance having an allyl group is 5-allyl dibenzosuberenol.

5. An agent for water treatment according to claim 2, wherein ratio by weight of the hydantoin compound to the polymer is 0.005 to 1.0.

6. A process for producing a polymer for water treatment having the function of water treatment and labeled with a fluorescent substance having an allyl group, which comprises copolymerizing the fluorescent substance having an allyl group obtained by introducing an allyl group into a fluorescent substance using a Grignard reagent with a monomer having a polymerizable double bond.

7. An agent for water treatment according to claim 1 wherein said labeled monomer is 5-allyl benzosuberenol, 2-hydroxy-2-allyl-1-benzopyran or 9-allyl-9-hydroxyanthrene.

8. An improved agent for water treatment which comprises a polymer having the function of water treatment for corrosion prevention or scale prevention wherein the improvement comprises said polymer incorporating units of a labeled monomer which is labeled with a fluorescent substance and has an allyl group;

wherein said labeled monomer is 5-allyl dibenzosuberenol, 2-hydroxy-2-allyl-1-benzopyran or 9-allyl-9-hydroxyanthrene, and said polymer contains a carboxyl group, a sulfonic acid group or a hydroxyl group.

9. An agent for water treatment according to claim 8 wherein said labeled monomer is 5-allyl dibenzosuberenol.

10. An agent for water treatment according to claim 9, wherein the polymer is a water-soluble polymer comprising units of a monomer containing carboxyl group.

11. An agent for water treatment according to claim 1, which additionally comprises a hydantoin compound in a ratio by weight of hydantoin compound to the polymer of 0.005 to 1.0.

12. An improved agent for water treatment which comprises a polymer having the function of water treatment for corrosion prevention or scale prevention wherein the improvement comprises said polymer incorporating units of a labeled monomer which is labeled with a fluorescent substance and has an allyl group;

said agent for water treatment comprising a copolymer of maleic anhydride and 5-allyl dibenzosuberenol.

13. A process for producing a polymer according to claim 6, wherein the fluorescent substance having an ally group is 5-allyl dibenzosuberenol.

14. An agent for water treatment of claim 8, further comprising a hydantoin compound.

15. An agent for water treatment of claim 14, wherein the fluorescent substance having an allyl group is 5-allyl dibenzosuberenol.

16. An agent for water treatment according to claim 1, wherein said polymer contains a carboxyl group, a sulfonic acid group or a hydroxyl group.

17. An agent for water treatment according to claim 1 comprising a copolymer of maleic anhydride.

18. An agent for water treatment according to claim 17 further comprising a hydantoin compound in a ratio by weight of hydantoin to the polymer of 0.005 to 1.0.

* * * * *